United States Patent

Buck et al.

[11] 4,011,764
[45] Mar. 15, 1977

[54] STEERING GEAR WITH VARYING TRANSMISSION RATIO

[75] Inventors: Günther Buck, Tettnang; Alfred Seifried, Friedrichshafen; Albert Zettel, Schwabisch Gmund, all of Germany; Hans-Christof von Fraunberg, deceased, late of Iggingen, Germany, by Sigrid Köhler-Feuerle, heiress

[73] Assignee: Zahnradfabrik Friedrichshafen AG, Friedrichshafen, Germany

[22] Filed: July 30, 1973

[21] Appl. No.: 383,495

[30] Foreign Application Priority Data

July 29, 1972 Germany ............... 2237421

[52] U.S. Cl. ........................... 74/499; 74/422; 74/32; 74/89.1 S
[51] Int. Cl.$^2$ ............................... B62D 1/20
[58] Field of Search ............ 74/32, 499, 459, 422, 74/89.18, 425

[56] References Cited

UNITED STATES PATENTS

| 903,349 | 11/1908 | Barnes | 74/499 |
|---|---|---|---|
| 1,726,621 | 9/1929 | Hart | 74/422 |
| 2,731,277 | 1/1956 | Pearne | 74/32 |
| 3,161,072 | 12/1964 | Le Tourneau | 74/89.15 |
| 3,250,147 | 5/1966 | Barton et al. | 74/499 |
| 3,310,990 | 3/1967 | Zettel | 74/422 |
| 3,710,640 | 1/1973 | Stanger | 74/425 |
| 3,810,395 | 5/1974 | Takahashi | 74/459 |

FOREIGN PATENTS OR APPLICATIONS

| 1,274,434 | 9/1961 | France | 74/498 |

*Primary Examiner*—Samuel Scott
*Assistant Examiner*—Weeley S. Ratliff, Jr.
*Attorney, Agent, or Firm*—Karl F. Ross; Herbert Dubno

[57] ABSTRACT

A nut on a helically threaded steering shaft, held against rotation, carries a first set of involute teeth meshing with a second set of involute teeth on an adjoining gear sector which pivots on an axis skew to that of the shaft. The two sets of teeth have centers of curvature offset from the sector axis but aligned with that axis in a midposition in which they engage each other without play; upon a shift of the nut to either side, the tooth clearance or backlash increases progressively while the transmission ratio either increases or decreases, depending upon the relative positions of the two centers of curvature and the sector axis. In a limiting case, the radius of curvature of one set of teeth is infinite.

6 Claims, 24 Drawing Figures

PRIOR ART

STEERING GEAR WITH VARYING TRANSMISSION RATIO

FIELD OF THE INVENTION

Our present invention relates to a gear coupling, e.g. as used in the steering assembly of an automotive vehicle, in which a first tooth carrier (such as a non-rotatable nut traversed by a helically threaded shaft) is linearly shiftable in a predetermined plane and is provided with a first set of involute teeth meshing with a second set of involute teeth on a second tooth carrier, such as a gear sector which is swingable about a pivotal axis transverse to the aforementioned plane.

BACKGROUND OF THE INVENTION

It is known, e.g. from U.S. Pat. No. 2,159,225, to give a convex curvature to the teeth of the first carrier (referred to hereinafter as a steering nut) and to impart similar convex curvatures to the two symmetrical halves of the second tooth carrier (referred to hereinafter as a gear sector), the centers of curvatures of the two halves of the gear sector being laterally offset from the pivotal axis of that sector with a view to providing a progressively decreasing transmission ratio upon a shifting of the nut from a midposition toward either of two limiting positions. As further taught in that patent, the depth of interengagement of the teeth can be adjusted for the regulation of backlash.

A gear sector of this bilobate type, with two distinct centers of curvature, can be manufactured only with the aid of special machine tools.

OBJECTS OF THE INVENTION

The principle object of our invention is to provide an improved gear coupling of progressively varying transmission ratio with a tooth profile adapted to be produced in simple manner by conventional hobbing operations.

Another object is to provide a gear coupling of this character which can be designed for transmission ratios changing monotonically in either sense (i.e. increasing or decreasing) from the midposition of the system to each limiting position thereof.

SUMMARY OF THE INVENTION

We realize the aforestated objects, in accordance with the present invention, by providing the two sets of involute and identically profiled teeth (on the steering nut and on the gear sector) with respective base lines whose centers 4 curvature are offset from the pivotal axis of the gear sector but are aligned with that axis in the midposition, with the line through these centers extending in that midposition transversely to the direction of shift of the nut; at least the base line of one set of teeth (preferably that of the nut) has a finite radius of curvature whereas the base line of the other set of teeth may be straight in a limiting case, it center of curvature then lying at infinity. Upon proper transverse adjustment, the two sets of teeth engage each other with clearances which are substantially zero in the midposition but which progressively increase toward the two limiting positions, this change coinciding with a substantially continuous increase or decrease of the transmission ratio depending on the relative positions of the two centers of curvature and the sector axis.

For the initial adjustment of tooth clearance, and to enable the elimination of additional backlash due to wear, the teeth of either or both sets may be tapered in the direction of the sector axis along which the two tooth carriers are relatively displaceable. Such adjustability is known per se from the aforementioned German patent and from U.S. Pat. No. 2,226,038.

BRIEF DESCRIPTION OF THE DRAWING

The above and other features of our invention will now be described in detail with reference to the accompanying drawing in which.

SPECIFIC DESCRIPTION

Figure 1:
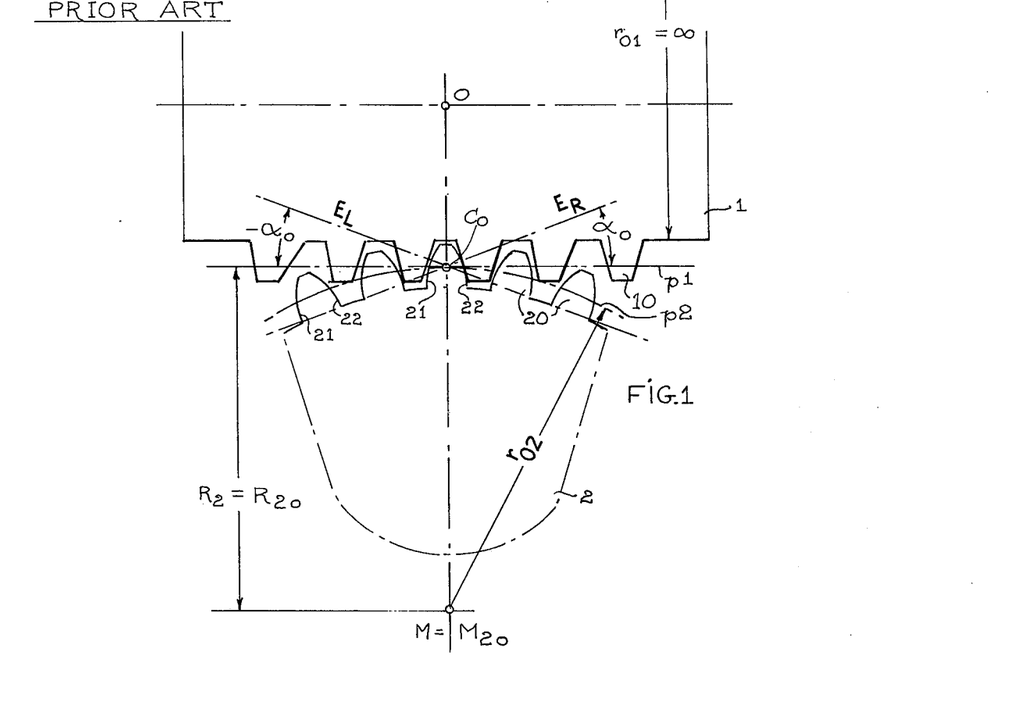
FIG. 1 diagrammatically illustrates, in elevation, a steering nut and a gear sector of a conventional steering-gear assembly with constant transmission ratio.

In FIG. 1 we have shown a conventional gear coupling comprising a nut 1, centered on an axis O and shiftable therealong, having rack teeth 10 in mesh with involute teeth 20 of a gear sector 2 whose pivotal axis passes through a fulcrum M. This fulcrum is also the center $M_{20}$ of the pitch circle $p2$ of teeth 20, having a radius $r_{02}$, and of its nonillustrated base circle. Two straight lines $E_R$ and $E_L$, tangent to this base circle, intersect in a point $C_0$, termed the pitch point, which is common to the pitch circle $p2$ and the corresponding line $p1$ relating to the teeth 10; the latter line may be regarded as a circle of radius $r_{01} = \infty$. Line $E_L$ is the line of action for the left flank 21 of the middle tooth of gear sector 2, effective upon a rightward shift of nut 1 from its illustrated midposition; line $E_R$ is the line of action for the right flank 22 of the middle tooth, effective during a leftward shift of the nut.

In this and subsequent Figures the subscript $o$ indicates the midposition of the system. In the case of tapering teeth, as particularly described hereinafter with reference to FIGS. 2 and 3, the illustrated relationship applies to the central plane perpendicular to the pivotal axis M.

Figure 3:
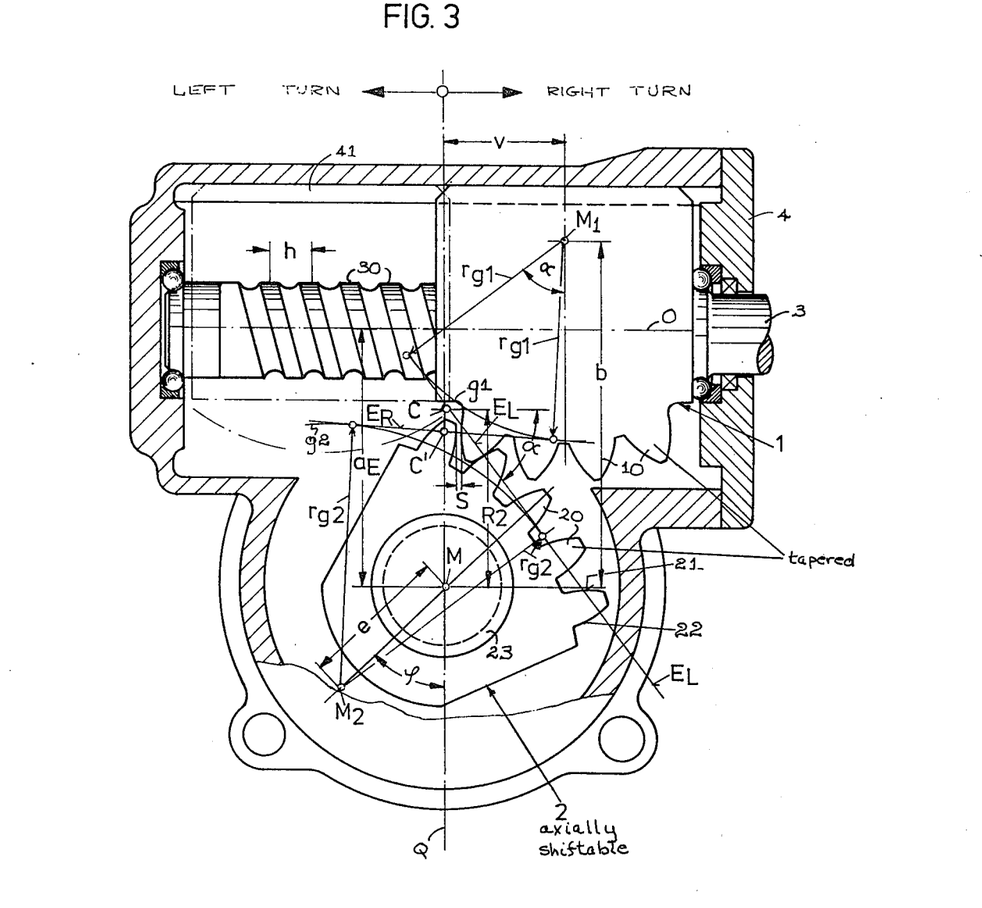
FIG. 3 is an elevational view, partly in section, of a steering-gear assembly including the gear coupling of FIG. 2 here shown in one of its limiting positions.

The nut 2 is nonrotatably mounted on a steering shaft 3 (FIG. 3) having an extremity in the form of a leadscrew or spindle provided with male helical threads 30 of pitch $h$; these threads are positively coupled with similar female threads in the nut body, e.g. by means of bearing balls as taught in the aforementioned U.S. Pat. No. 2,159,225. The nut 1 is held against rotation, as also shown in FIG. 3, by a key 41 extending longitudinally of a housing 4 and engaging in a keyway of the nut.

Figure 1A:
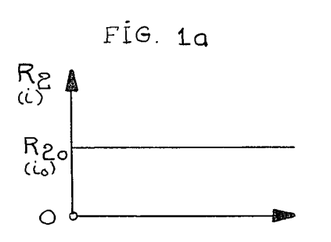
FIGS. 1a and 1b are graphs showing the radius of contact (proportional to transmission ratio) and the tooth clearance as a function of the angle of deflection of the gear sector from its midpositon.
Figure 1B:
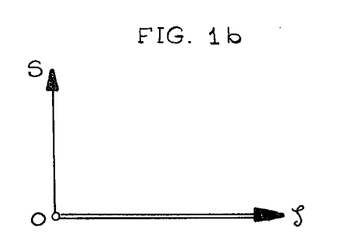

As more fully discussed below, the transmission ratio $i$ of a gear coupling of the type here described is determined by the relationship $$i = \frac{2\pi}{h} R_2$$

where $h$ is the pitch of the spindle threads 30 and $R_2$ is the radius of contact, i.e. the distance between the fulcrum M and the pitch point ($C_o$ for the midposition) which in the conventional system of FIG. 1 has a constant magnitude $R_{20}$ and equals the pitch radius $r_{o2}$. With pitch $h$ constant over the entire working range, the transmission ratio $i$ is directly proportional to the pitch radius $r_{o2}$ and is therefore invariable over that range as illustrated in FIG. 1a where $R_2$ and $i$ have been plotted against the angle of deflection $\phi$ (see FIG. 3) of sector 2 from its midposition. FIG. 1b shows the tooth clearance S (of FIG. 3) as being also constant throughout the working range. The two lines of action $E_R$ and $E_L$ include constant angles $\pm \alpha_o$ with the direction of shift axis O, i.e. the horizontal or x direction.

We shall now describe various embodiments of our invention in which the transmission ratio $i$ is no longer constant, as in the conventional system of FIG. 1, but varies monotonically from the midposition to either of the two symmetrical limiting or terminal positions. With these improved gear couplings we have been able to realize, in otherwise conventional automotive steering-gear assemblies, terminal transmission ratios differing by about ± 30% from the starting ratio in the midposition of the system, with a maximum swing angle 6 max of ±45° and a terminal tooth clearance $S_e$ (cf.FIG. 10) of about 0.2 mm.

Figure 2:
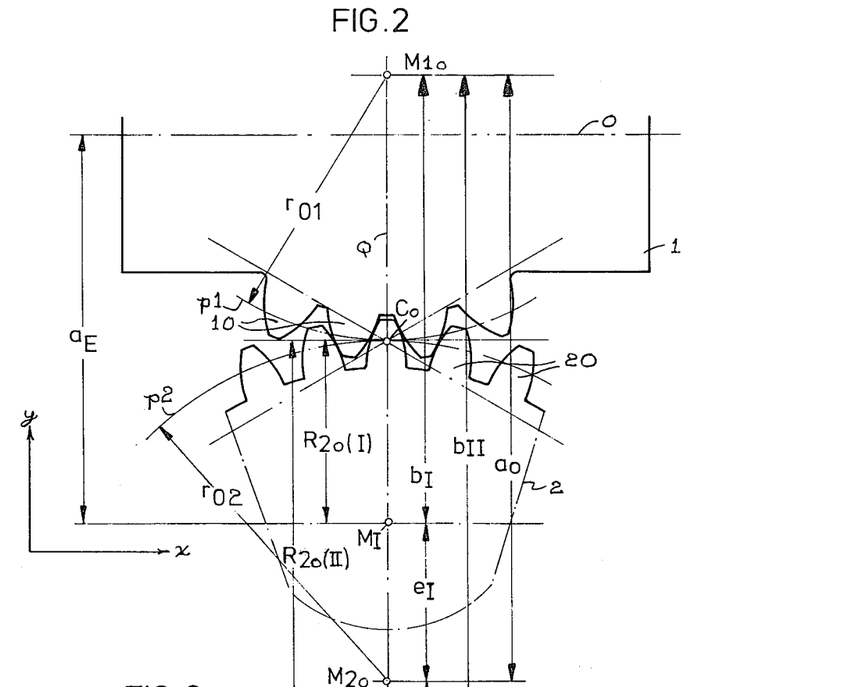
FIG. 2 is a view similar to FIG. 1, illustrating an improved gear coupling according to our invention.

In FIGS. 2 and 3 we have illustrated a steering nut 1 and a gear sector 2 whose teeth 10 and 20, of uniform configuration within each set, have their crests disposed along arcs which turn their convex sides toward each other. The pitch circles $p1$ and $p2$ of these teeth, with radii $r_{o1}$ and $r_{o2}$, have respective centers $M_{10}$ and $M_{20}$ which in the midposition of FIG. 2 are also the centers of their respective base circles $g1$ and $g2$ of radii $r_{g1}$ and $r_{g2}$ (see FIG. 7). The distance between centers $M_{10}$ and $M_{20}$ has been designated $a_o$.

In FIG. 2 we have indicated two possible fulcra $M_I$ and $M_{II}$ for the sector 2, each of these fulcra being offset from both centers $M_{10}$ and $M_{20}$ by lying in the illustrated midposition on a common line Q therewith which is perpendicular to the axis O of nut 1. The spacing of axis O from the sector axis, specifically the fulcrum $M_I$, has been designated $a_E$. Fulcrum $M_I$, which is disposed intermediate the two centers $M_{10}$ and $M_{20}$, is separated from center $M_{10}$ by a fixed distance $b_I$ and from center $M_{20}$ by a distance (termed eccentricity) $e_I$; in the case of fulcrum $M_{II}$, which lies on the side of center $M_{10}$ remote from center $M_{10}$, the corresponding parameters have been designated $b_{II}$ and $e_{II}$. It will be apparent that $a_o = b_I + e_I = b_{II} - e_{II}$. The radius of contact in the midposition, i.e. the distance of pitch point $C_o$ from the respective fulcrum, has been designated $R_{20}$ (I) in the case of fulcrum $M_I$ and $R_{20}$ (II) in the case of fulcrum $M_{II}$.

Advantageously, as indicated in FIG. 3, the teeth 10 and 20 (in the present embodiment as well as in those described hereinafter) taper in the direction of the pivotal axis of sector 2 which, as also shown in FIG. 3, has a stub shaft 23 journaled in housing 4. An axial shift of sector 2 then enables the two sets of teeth to be relatively adjusted so as to eliminate any play in the midposition of FIG. 2. If desired, the thickness of the middle tooth 20 in the swing plane may be increased (or reduced) to an extent varying along the axial width of that tooth to provide a progressive zero shift for the involute tooth profile in each half of sector 2.

Figure 2A:
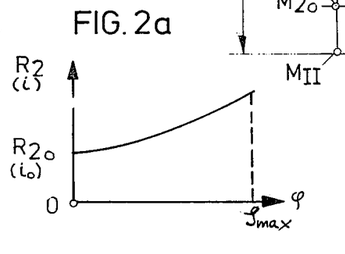
FIGS. 2a and 2b are graphs analogous to FIGS. 1a and 1b, respectively, for a first position of the fulcrum of the gear sector.
Figure 2B:
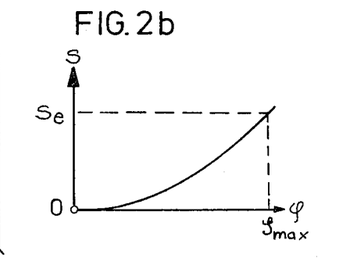
Figure 2C:
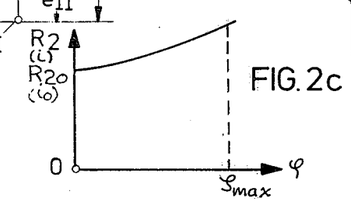
FIGS. 2c and 2d are graphs respectively corresponding to FIGS. 2a and 2b but for a second position of the fulcrum of the gear sector.
Figure 2D:
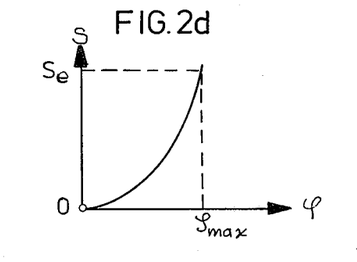

FIG. 2a shows the variation in contact radius $R_2$, and therefore in transmission ratio $i$, over the entire operating range starting from the midposition $\phi = o$, the swing axis in this instance going through the fulcrum $M_I$. It will be noted that ratio $i$ increases progressively from its starting value $i_o$, the same being true with the sector 2 swingable about fulcrum $M_{II}$ as indicated in FIG. 2c. FIGS. 2b and 2d show a progressive increase, for the two operating conditions referred to, in the tooth clearance S which varies from zero at $\phi = o$ to a maximum $S_e$ at $\phi = \phi_{max}$. Owing to this continuous rise in clearance, which is due to the progressive increase in the center spacing $a$ as a function of the swing angle $\phi$, the system of FIG. 2 is physically realizable with either fulcrum $M_I$, $M_{II}$. In the subsequent description given with reference to FIG. 3, however, only the intermediate fulcrum $M_I$ (hereinafter designated M) will be considered; in this and subsequent Figures, the spacing of the fulcrum and the two centers $M_1$ and $M_2$ of base circles $g1$ and $g2$ has been simply designated $b$ and $e$, respectively.

In FIG. 3 the steering nut 1 has been shifted from its midposition to the right (corresponding to a right turn of the associated steering mechanism) by a distance $v$ with resulting entrainment of gear sector 2 through an arc $\phi$ about its fulcrum M, the center $M_1$ being therefore spaced by the same distance $v$ from the centerline Q passing through that fulcrum. Since the pitch point is defined as the point in which the velocities of the two movable members 1, 2 have the same magnitude and direction, this point must lie on the centerline Q along which the motion of all parts of sector 2 is parallel to the spindle axis O. Moreover, since the left tooth flanks 21 are active during this rightward shift, the instantaneous pitch point must be located at the intersection C of line Q with the action line $E_L$ which is normal to the active flank 21 at the point of contact. Upon the reverse motion with the nut 1 driving, i.e. a return of the mechanism to its midposition under the control of the steering wheel, the right flanks 22 would be active so that the pitch point would be at the intersection C' of centerline Q with the other action line $E_R$. In switching to this restoring motion, the active tooth 10 of nut 1 experiences some lost motion in traversing the clearance S.

The distance $R_2$ between the fulcrum M and the pitch point C, representing the effective lever arm during the rightward shift, is larger than the corresponding radius $R_{20}$ in the midposition (FIG. 2) with resulting increase in transmission ratio $i$ as shown in FIG. 2a. For the restoring motion the lever arm and the transmission ratio are less than $R_{20}$ and $i_o$, respectively; this, however, is practically without significance since the return of the steering wheel to straightforward drive generally requires little energy in automotive vehicles.

Pitch point C is also effective in the case of a left turn, i.e. upon a swing of sector 2 toward its opposite limiting position, whereas pitch point C' comes into play during the reverse restoring motion.

At $\alpha$ we have indicated the angle of attack included between the surface normal $E_L$ and the shift direction (axis O) in the swung-out position of sector 2.

A comparison of FIGS. 2a and 2b with FIGS. 2c and 2d reveals that the increasing change in transmission ratio is less pronounced but that the clearance S rises more sharply if the fulcrum M is relocated from $M_I$ (FIG. 2) to $M_{II}$.

Figures 4, 4A, 4B:
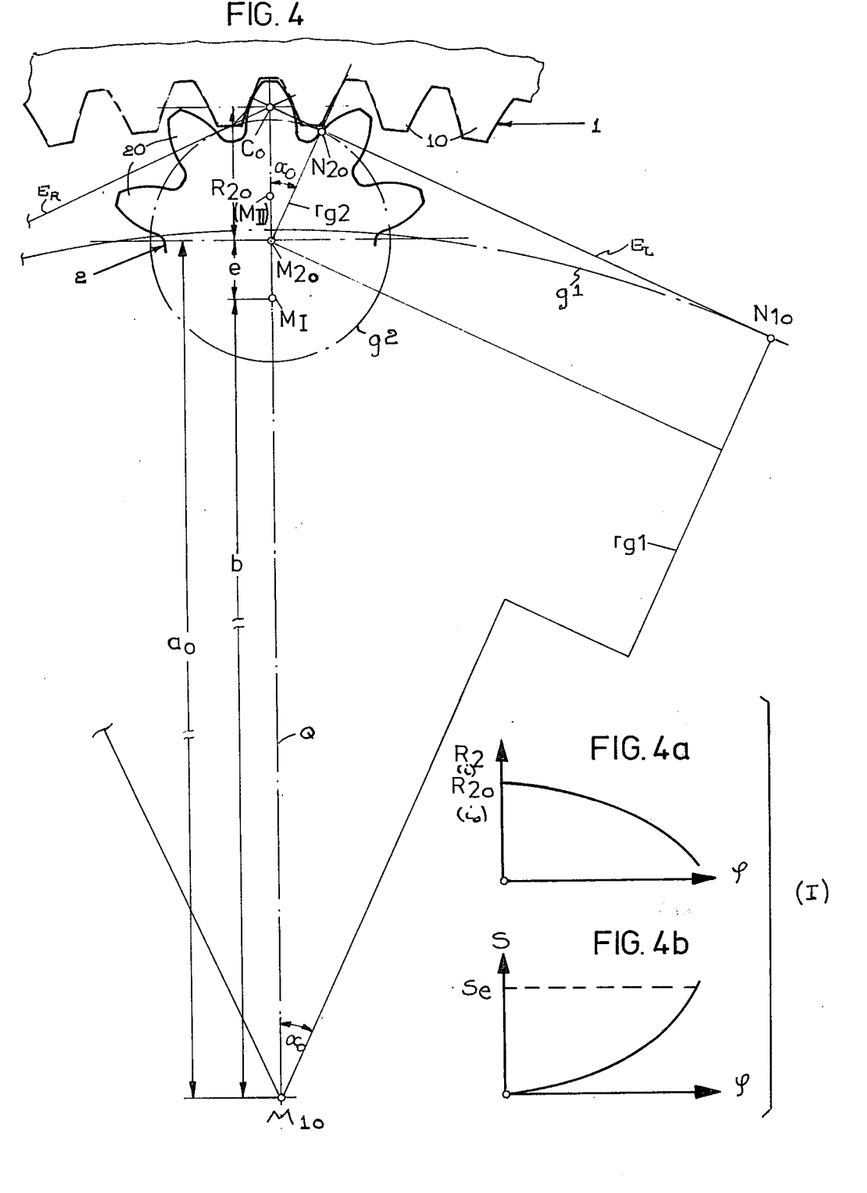
FIG. 4 is a view similar to FIG. 2, showing a modified gear coupling according to the invention in its midposition.
FIGS. 4a, 4b, 4c, 4d are graphs analogous to FIGS. 2a, 2b, 2c, 2d but relating to the embodiment of FIG. 4.
Figures 4C, 4D, 5:
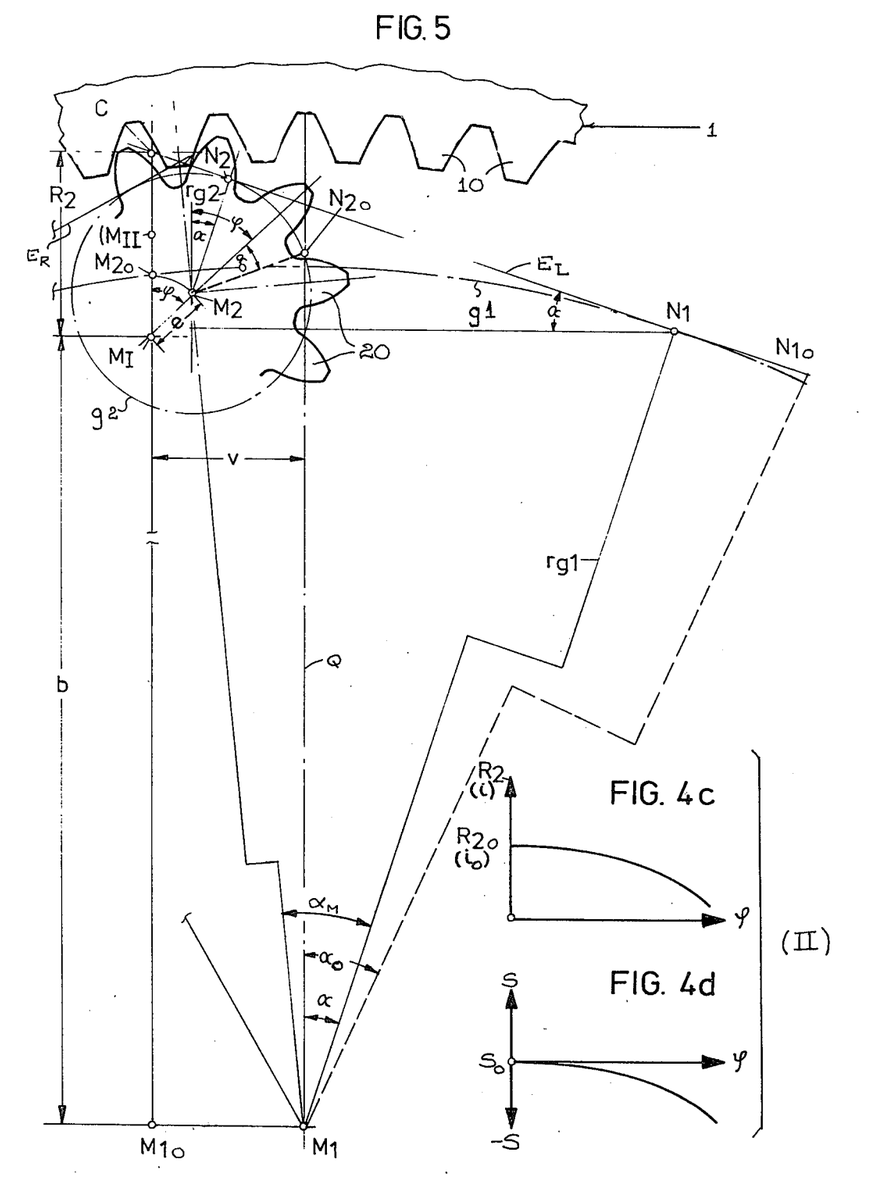
FIG. 5 is a view similar to FIG. 4 but showing the gear coupling thereof in one of its limiting positions.

In FIGS. 4 and 5 we have shown a system in which the gear sector 2 has the same general curvature (convex toward the nut 1) as in the preceding embodiment whereas the crests of the teeth 10 of the nut lie on an arc which is concave toward the sector 2. In the midposition of FIG. 4, the two centers of curvature $M_{10}$ and $M_{20}$ of base circles $g1$ and $g2$ lie again on the centerline Q passing through the fulcrum of the sector for which two positions, $M_I$ between the two centers and $M_{II}$ on the side of center $M_{20}$ remote from center $M_{10}$, have again been indicated.

FIGS. 4a and 4b, relating to fulcrum position $M_I$, show a progressive decrease in lever arm $R_2$ and transmission ratio $i$ from their starting values $R_{20}$ and $i_o$, coupled with a progressive increase in tooth clearance S to its final values $S_e$. This system, therefore, is physically realizable. On the other hand, FIG. 4d shows a progressive decrease in tooth clearance S (accompanied by a decreasing transmission ratio according to FIG. 4c) leading, for $S_o = 0$, to negative values which would make the system unworkable since the teeth would encroach upon one another. It may be mentioned that, for small values of $\phi$, the transmission ratio $i$ as plotted in FIG. 4a may rise somewhat above its initial value $i_o$ before progressively decreasing to its final magnitude.

The parameters $a_o, b, e, v, \alpha_o, \alpha$ and $\phi$ in FIGS. 4 and 5 have the same significance as in FIGS. 2 and 3. Surface normals $E_L$ and $E_R$ are tangent to base circles $g1$ and $g2$ at points $N_{10}$ and $N_{20}$ in the midposition of FIG. 4 and at points $N_1$ and $N_2$ in the limiting position of FIG. 5.

Figure 6:
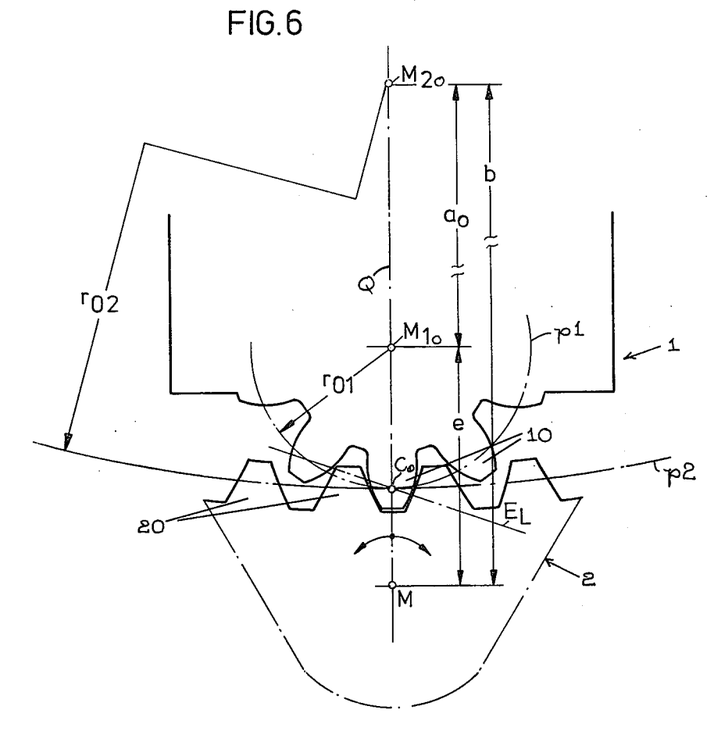
FIG. 6 is another view similar to FIG. 2, illustrating the midposition of a further embodiment.
Figure 6A:
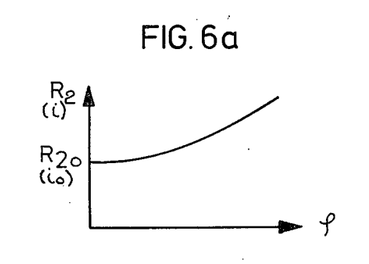
FIGS. 6a and 6b are graphs analogous to FIGS. 2a and 2b but relating to the embodiment of FIG. 6.
Figure 6B:
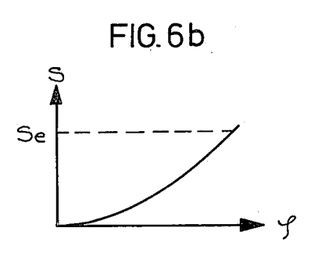

FIG. 6 shows an inversion of the system of FIGS. 4 and 5 in which the sector 2 lies on the convex side of the arc of the crests of teeth 10 and their pitch circle $p1$, as in FIGS. 2 and 3, but has its own teeth 20 curved along an arc confronting the nut 1 with its concave side, as particularly indicated for its pitch circle $p2$. With sector 2 swingable about a fulcrum M on an extension of the line Q interconnecting the two centers $M_{10}$ and $M_{20}$, a workable system is obtained whose transmission ratio $i$ and tooth clearance S progressively increase from the illustrated midposition outwardly as indicated in the graphs of FIGS. 6a and 6b.

In a limiting case intermediate those shown in FIGS. 2 and 6, the teeth 20 form a rack with their pitch radius $r_{20}$ as well as their base radius $r_{g2}$ (cf. FIGS. 2 - 5) going to infinity. In another limiting case, intermediate those of FIGS. 2 and 4, the teeth 10 form a rack with $r_{10} = r_{g1} = \infty$; this case is distinguished from the conventional system of FIG. 1 in that $M \neq M_{20}$.

Figure 7:
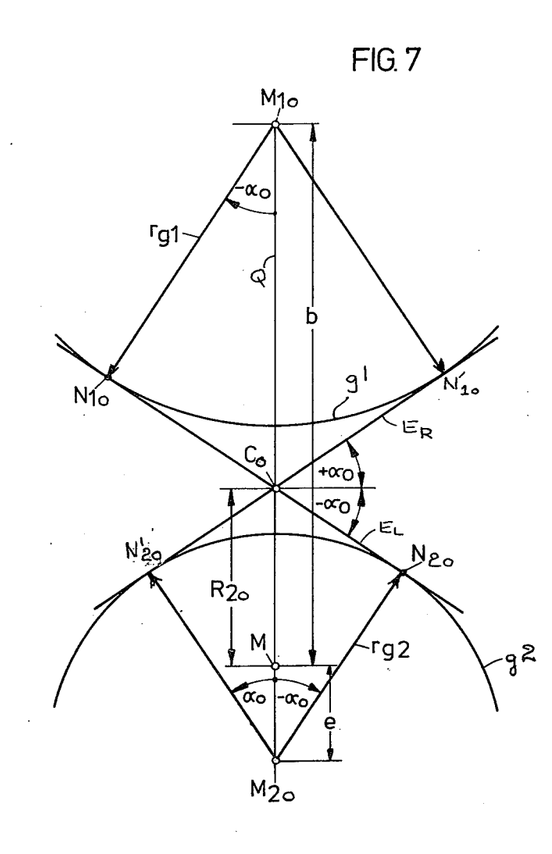
FIGS. 7 and 8 are explanatory diagrams relating to the system of FIG. 6 in its midposition and in a limiting position, respectively.
Figure 8:
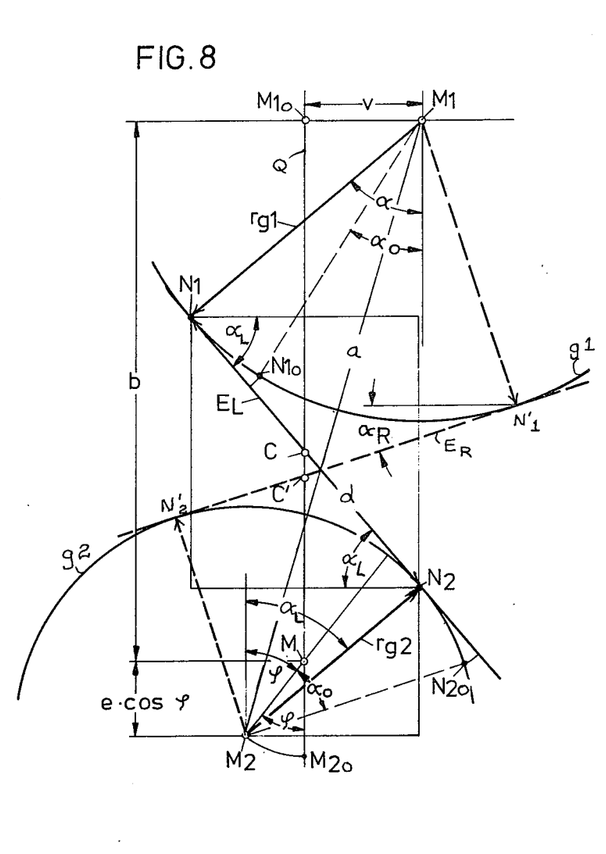
Figure 9:
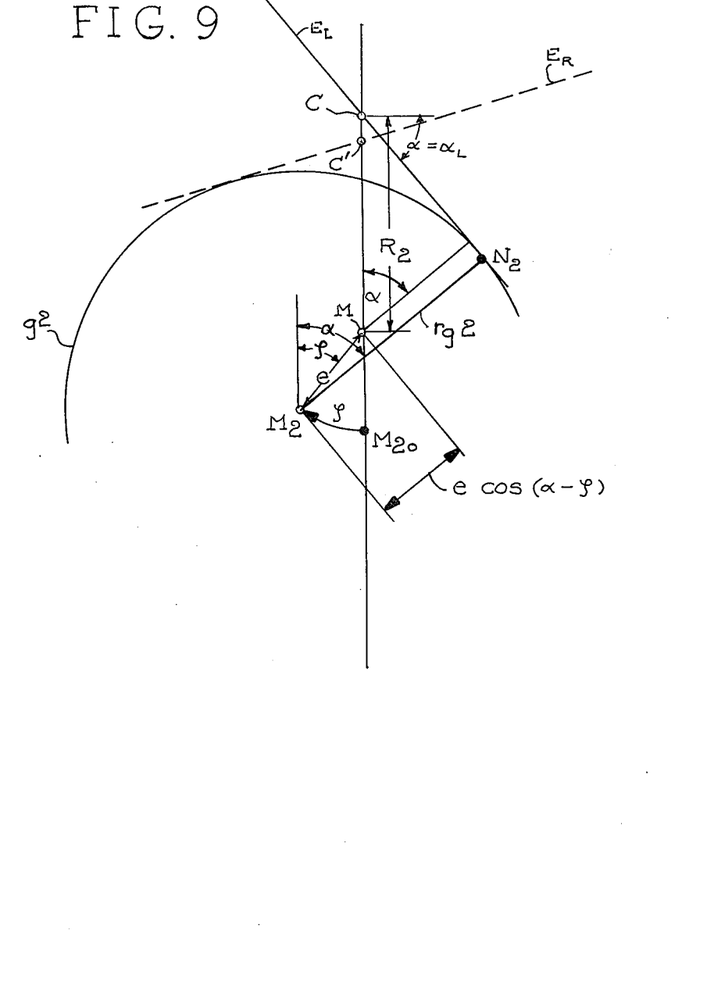
FIG. 9 is a diagram corresponding to part of FIG. 8, with indication of additional parameters.

In FIGS. 7 - 9 we have illustrated the points of tangency $N_{10}$, $N_{20}$ and $N_1$, $N_2$ of the surface normal $E_L$ as well as corresponding points $N'_{10}$, $N'_{20}$ and $N'_1$, $N'_2$ of the surface normal $E_R$ on the two base circles $g1$ and $g2$ in the midposition and in a swung-out position of the system. In FIGS. 8 and 9 the angles of attack included by lines $E_L$ and $E_R$ with the horizontal (i.e. with the direction x of the shift axis) have been designated $\alpha_L$ and $\alpha_R$, with the former larger than the latter. FIG. 8 further shows the mutually opposite displacement of centers $M_1$ and $M_2$ with reference to line Q. The distance between points $N_1$ and $N_2$ has been designated $d$.

Figure 10:
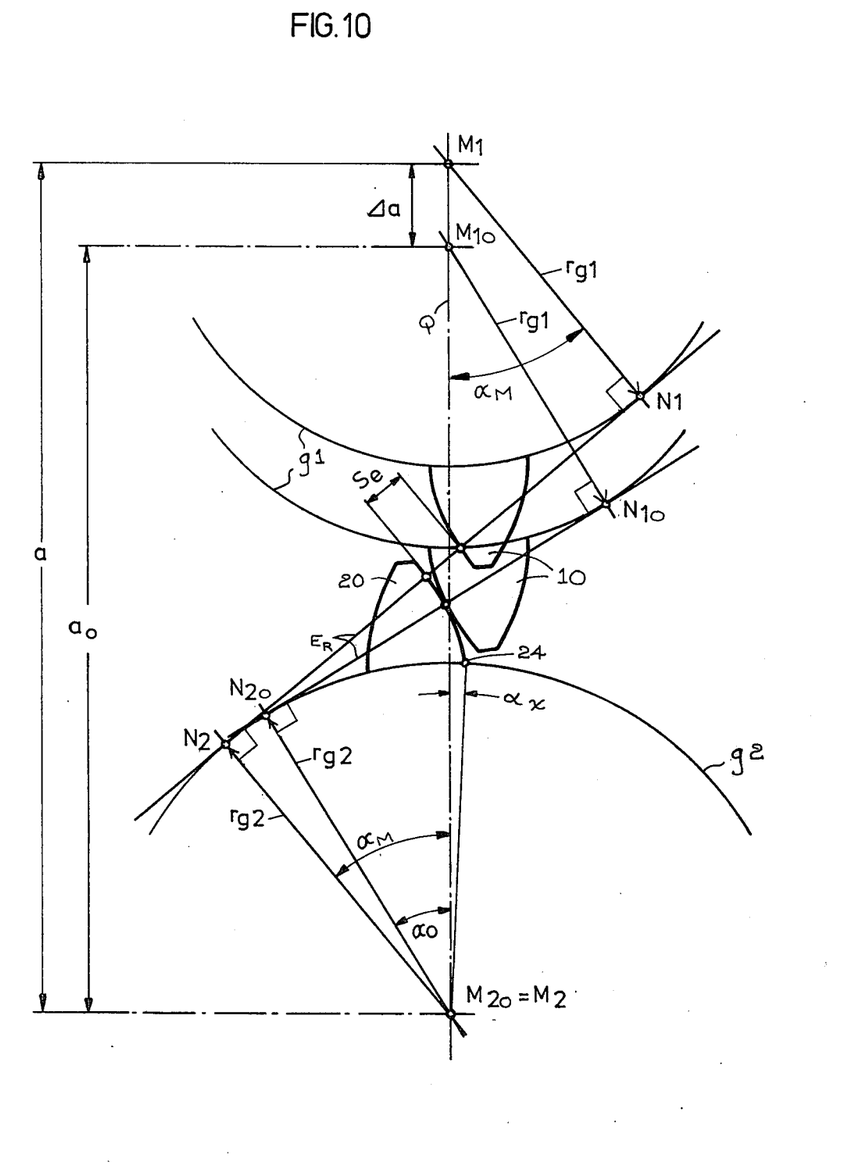
FIG. 10 is a diagram relating to the system of FIGS. 2 and 3, with two positions thereof superposed to explain the determination of tooth clearance.

IN FIG. 10 we have superimposed the relative position of two coacting teeth 10 and 20 with a very small angle $\phi$ (corresponding to a minor offset from the midposition of FIG. 2) upon the relative position of corresponding teeth in the case of a maximum rightward swing ($\phi = \phi_{max}$). In the first position the teeth contact each other (S − 0) whereas in the second position they are separated by the terminal clearance $S_e$. With the centers $M_1$ and $M_2$ projected back into line Q, the angle included between the parallel radii $r_{g1}$, $r_{g2}$ and the surface normal $E_R$ has been designated $\alpha_M$. The line connecting the base point 24 of tooth 20 with the center $M_{20} = M_2$ includes with the centerline Q an angle $\alpha_x$ determined by the geometry of the tooth profile. The vertical spacing (perpendicular to the shift axis) of centers $M_1$ and $M_{10}$ has been designated $\Delta a = a - a_o$. To prevent any jamming of the gear teeth, $\Delta a$ must be positive in the system of FIGS. 2 and 3 but negative in that of FIGS. 4 and 5.

CALCULATION OF INSTANTANEOUS SYSTEM PARAMETERS

We shall now describe the manner in which the transmission ratio $i$ and the tooth clearance S can be calculated, on the basis of preselected system parameters, for off-normal positions with outward entrainment of the gear sector 2 by the steering nut 1 in either direction. For the restoring motion, again with entrainment of the sector by the nut, the corresponding value can be obtained by a change of the sign.

According to FIGS. 7 and 8 the following relationship can be derived from the conditions of development (thread-length measurements):

$$d = \overline{N_1N_2} = \overline{N_{10}N_{20}} + \overline{N_1N_{10}} - \overline{N_{20}N} = (b+e)\sin\alpha_o + r_{g1}(\alpha - \alpha_o) - r_{g2}(\phi + \alpha_o - \alpha) \quad (1)$$

The corresponding equation for a gear coupling with concave curvature of its steering-nut teeth, according to FIGS. 4 and 5, is obtained by replacing $r_{g1}$, $b$ and $e$ with $-r_{g1}$, $-b$ and $-e$ whence $$d = (b+e)\sin\alpha_o - r_{g1}(\alpha_o - \alpha + r_{g2}(\phi + \alpha_o - \alpha) \quad (1a)$$

By projecting the various distances in FIG. 8 upon the horizontal or x direction (and with substitution of $\alpha$ for $\alpha_L$) we can write;

$$d \cdot \cos\alpha = r_{g2}\sin\alpha - e \cdot \sin\phi - v + r_{g1}\sin\alpha$$

whence $$d = (r_{g1} + r_{g2}) \tan\alpha - \frac{e \cdot \sin\phi + v}{\cos\alpha} \quad (2)$$

The corresponding equation for the system of FIGS. 4 and 5 reads:

$$d = (r_{g1} - r_{g2}) \tan\alpha + \frac{v - e \cdot \sin\phi}{\cos\alpha} \quad (2a)$$

A projection upon the vertical of y direction yields:

$$b + e \cdot \cos\phi = r_{g1}\cos\alpha + d \cdot \sin\alpha + r_{g2}\cos\alpha$$

whence $$d = (r_{g1} + r_{g2}) \cot\alpha + \frac{b + e \cdot \cos\phi}{\sin\alpha} \quad (3)$$

Correspondingly, for the system of FIGS. 4 and 5:

$$d = \frac{b + e \cdot \cos\phi}{\sin\alpha} - (r_{g1} - r_{g2}) \cot\alpha \quad (3a)$$

The foregoing equations (1) – (3), or (1a) – (3a), contain four unknown variables $d$, $\alpha$, $\phi$ and $v$. Of interest is the change in displacement $v$ as a function of swing angle $\phi$.

From equations (1) and (3) we obtain, through elimination of $d$, an implicit function $\alpha = \alpha(\phi)$ as follows:

$$(b + e) \sin\alpha_o + r_{g1}(\alpha - \alpha_o) - r_{g2}(\phi + \alpha_o - \alpha) + (r_{g1} + r_{g2}) \cot\alpha - \frac{e \cdot \cos\phi + b}{\sin\alpha} = 0 \quad (4)$$

Similarly, from equations (1a) and (3a);

$$(b + e) \sin\alpha_o - r_{g1}(\alpha_o - \alpha) + r_{g2}(\phi + \alpha_o - \alpha) + (r_{g1} - r_{g2}) \cot\alpha - \frac{e \cdot \cos\phi + b}{\sin\alpha} = 0 \quad (4a)$$

With the values of $r_{g1}$, $r_{g2}$, $e$, $b$ and $\alpha_o$ given, equation (4) or (4a) can be approximately solved for $\alpha$ (e.g. by graphic interpolation) with regard to any chosen value of $\phi$.

The displacement $v = v(\phi)$ can be determined from equations (2) and (3) as follows:

$$v = \frac{r_{g1} + r_{g2}}{\sin\alpha} - \frac{e \cdot \cos\phi + b}{\tan\alpha} - e \cdot \sin\phi \quad (5)$$

Analogously, from equations (2a) and (3a):

$$v = e \cdot \sin\phi + \frac{b + e \cdot \cos\phi}{\tan\alpha} - \frac{r_{g1} - r_{g2}}{\sin\alpha} \quad (5a)$$

Equations (4) and (5) yield, jointly, the desired law of motion $v = v(\phi)$ for any gear coupling with predetermined values of $r_{g1}$, $r_{g2}$, $\alpha_o$, $e$ and $b$.

According to FIG. 7, $$\cos\alpha_o = \frac{r_{g1} + r_{g2}}{e + b} \quad (6)$$

The transmission ratio $i$ can be derived from the function $v(\phi)$ through differentiation, with $$i = \frac{\delta v}{\delta \phi} = \frac{\Delta v}{\Delta \phi};$$

however, its momentary magnitude can also be determined directly from the effective lever arm $R_2$ of the gear sector, according to the aforestated formula $$i = \frac{2\pi}{h} R_2$$

and the following relationship apparent from FIG. 9:

$$R_2 = \frac{r_{g2} - e \cdot \cos(\alpha - \phi)}{\cos\alpha} \quad (7)$$

Thus, in the starting position ($\phi = 0$) of FIG. 7, $$R_{2o} = \frac{r_{g2} - e \cdot \cos\alpha_o}{\cos\alpha_o} = \frac{r_{g2}}{\cos\alpha_o} - e \quad (8)$$

The center spacing $a_o = b + e$ is given, according to FIG. 7, by $$a_o = \frac{r_{g1} + r_{g2}}{\cos\alpha_o} \quad (9)$$

Analogously, for the system of FIGS. 4 and 5, $$a_o = \frac{r_{g1} - r_{g2}}{\cos\alpha_o} \quad (9a)$$

The foregoing relationships apply the situation, discussed above, in which the sector 2 is driven outwardly by the nut 1. For the restoring motion, i.e. entrainment of the sector by the nut toward the midposition, the signs of $\alpha$ and $\alpha_o$ must be inverted. With a given wing angle $\phi$ this leads to different magnitudes of the displacement $v$ inasmuch as the nut, upon reversing its direction, must first execute the aforementioned lost motion in traversing the existing tooth clearance S.

This clearance S can be calculated from the variable center spacing $a = \overline{M_1M_2}$ as follows (see FIGS. 8 and 10):

$$a = \sqrt{[a_o - e(1 - \cos\phi)]^2 + (v + e \cdot \sin\phi)^2} \quad (10)$$

The corresponding equation for the system of FIGS. 4 and 5 is:

$$a = \sqrt{[a_o - e(1 - \cos\phi)]^2 + (v - e \cdot \sin\phi)^2} \quad (10a)$$

The corresponding tangential distance $d$, pursuant to FIG. 10, is $$d = \sqrt{a^2 - (r_{a1} + r_{a2})^2} \qquad (11)$$

Analogously, for the system of FIGS. 4 and 5:

$$d = \sqrt{a^2 - (r_{a1} - r_{a2})^2} \qquad (11a)$$

The clearance S is given by $$S = d - (\alpha_M + \alpha_x)(r_{a1} + r_{a2}) \qquad (12)$$

For the system of FIGS. 4 and 5 we can write $$S = d + (\alpha_M + \alpha_x)(r_{a1} - r_{a2}) \qquad (12a)$$

The angle $\alpha_M$ is given by $$\tan \alpha_M = \frac{d}{r_{a1} \pm r_{a2}} \qquad (13).$$

NUMERICAL EXAMPLES

We shall now describe the determination of specific design parameters for a gear coupling according to our invention.

From the initial transmission ratio $$i_o = \frac{2\pi}{h} R_{20}$$

we obtain, for a given spindle pitch $h$, the effective lever arm $R_{20}$ in the midposition. Next, a suitable angle of attack $\alpha_o$ is selected in conformity with conventional gear design, e.g. $\alpha_o = 25°$. Also to be chosen are a convenient center spacing $a_o$ for the midposition and a tooth ratio $$u = \frac{z_2}{z_1} = \frac{r_{a2}}{r_{a1}},$$

$z_1$ and $z_2$ being the number of teeth 10 and 20, respectively, as calculated for a full circle. From these data we can derive the base-circle radii $r_{a1}$ and $r_{a2}$ with reference to equation (9) according to which $r_{a1} + r_{a2} = a_o \cos\alpha_o$. With $r_{a2} = u \cdot r_{a1}$, we obtain $$r_{a1} + u \cdot r_{a1} = a_o \cos\alpha_o$$

whence $$r_{a1} = \frac{a_o \cos\alpha_o}{u + 1}.$$

Since, from equation (8), $$e = \frac{r_{a2}}{\cos\alpha_o} - R_{20},$$

we find that $$e = \frac{r_{a2}}{\cos\alpha} - \frac{i_o h}{2\pi}.$$

The magnitude of distance $b$ is given by the relationship $b = a_o - e$.

The following parameters can now be calculated for any steering position, or swing angle $\phi$, and in particular from the limiting position in which $\phi = \phi_{max}$ (e.g. $\phi_{max} = 48°$).

Instantaneous pressure-exertion angle $\alpha$, from equation (4).

Displacement $v$, especially $v_{max}$, from equation (5).

Instantaneous radius of contact $R_2$ (proportional to transmission ratio $i$) from equation (7).

Instantaneous tooth clearance $S$, especially terminal clearance $S_e$, from equation (12).

If these calculations are repeated for a series of selected values of $a_o$ and $u$, we arrive at a family of curves in which the selected center spacing $a_o$ and the final clearance $S_e$ are plotted against final transmission ratio $i_e$ and tooth ratio $u$. Such a family of curves has been shown in the graph of FIG. 11 for the system of FIGS. 2 and 3, a similar graph in FIG. 12 relating to the system of FIGS. 4 and 5. Each graph, in turn, enables the selection of a suitable pair of values for the parameters $a_o$ and $u$ satisfying a given requirement as to a terminal transmission ratio $i_e$ and tooth clearance $S_e$. As a check, the clearance $S$, the displacement $v$ and the effective lever arm or radius $R_2$ can be calculated from the foregoing equations for the selected deflection $\phi_{max}$.

Figure 11:
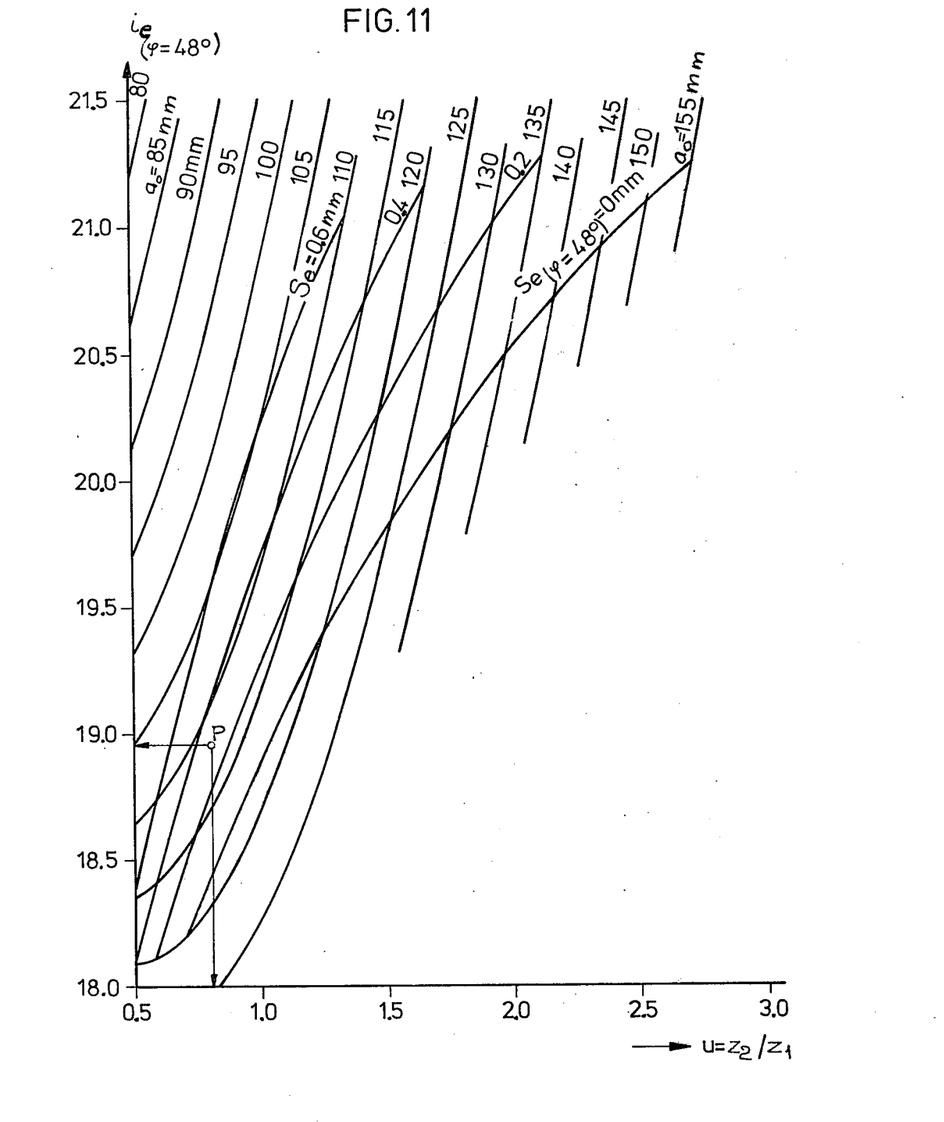
FIG. 11 is a graph serving for the determination of center spacing and tooth ratio in the system of FIGS. 2 and 3.

EXAMPLE 1 (FIGS. 2, 3 and 11)

The graph of FIG. 11 is based upon a starting transmission ratio $i_o = 15.5$ and a starting contact radius $R_{20} = 28.2$ mm.

As shown in FIGS. 2 and 3, the nut 1 carries four teeth 10 whereas the sector 2 is provided with five teeth 20. The pitch $h$ of the threads 30 on shaft 3 is 11.4 mm. From the relationship $$i_o = \frac{2\pi}{h} R_{20}$$

we calculate $$R_{20} = \frac{15.5 \cdot 11.4}{2\pi} \approx 28.1 \text{ mm}$$

which is close to the value on which FIG. 11 is based.

For a desired terminal transmission ratio $i_e = 19$ and clearance $S_e = 0.3$ mm we find in FIG. 11 a minimum center spacing $a_o = 112$ mm and a tooth ratio $u = 0.82$. Using a standard module $m_n = 4$ mm for the relationship between pitch radius and number of teeth, we obtain $$z_1 + z_2 = z_1(1 + u) = \frac{2a_o}{m_n} = 56$$

whence $$z_1 = \frac{56}{1.82} \approx 30.8.$$

With $z_1$ rounded up to 31, we have $z_2 = 56 - 31 = 25$.

From the actual values for $z_1$ and $z_2$ we obtain a modified tooth ratio $$u = \frac{31}{25} = 0.806.$$

This corresponds, according to FIG. 11, to a final transmission ration $i_e = 18.96$ (point P in FIG. 11) which is close to the desired value of 19.

From equation (9), and considering that $r_{o2} = u \cdot r_{o1}$, we derive (with $\alpha_o = 25°$)

$$r_{o2} = \frac{a_o \cos\alpha_o}{1 + \frac{1}{u}} = \frac{112 \cdot 0.90631}{2.2406} \approx 45.3 \text{ mm},$$

whence $r_{o1} = 56.2$ mm.

Equation (8) yields the eccentricity $$e = \frac{r_{o2}}{\cos\alpha_o} - R_{2o} = 49.98 - 28.12 \approx 21.9 \text{ mm}.$$

The distance $b$ from center $M_1$ to the fulcrum M is given by $$b = a_o - e = 112 - 21.9 = 90.1 \text{ mm}.$$

The foregoing values of $r_{o1}$, $r_{o2}$, $e$, $b$ and $\alpha_o$ enable the determination, from equation (4), of the angle of attack $\alpha$ for $\phi = 48°$ as $\alpha = 47° 50'$.

The final clearance $S_e$ can be computed from equations (10) – (13) as follows:

$a = 112.56$ mm;

$d = 48.64$ mm;

$\alpha_M = 25.6°$;

$S_e = 0.25$ mm.

Equation (5) yields $v_{max} = 24.9$ mm. The corresponding lever arm $R_2$ is calculated, as per equation (3), as $R_2 = 34.4$ mm.

Figure 12:
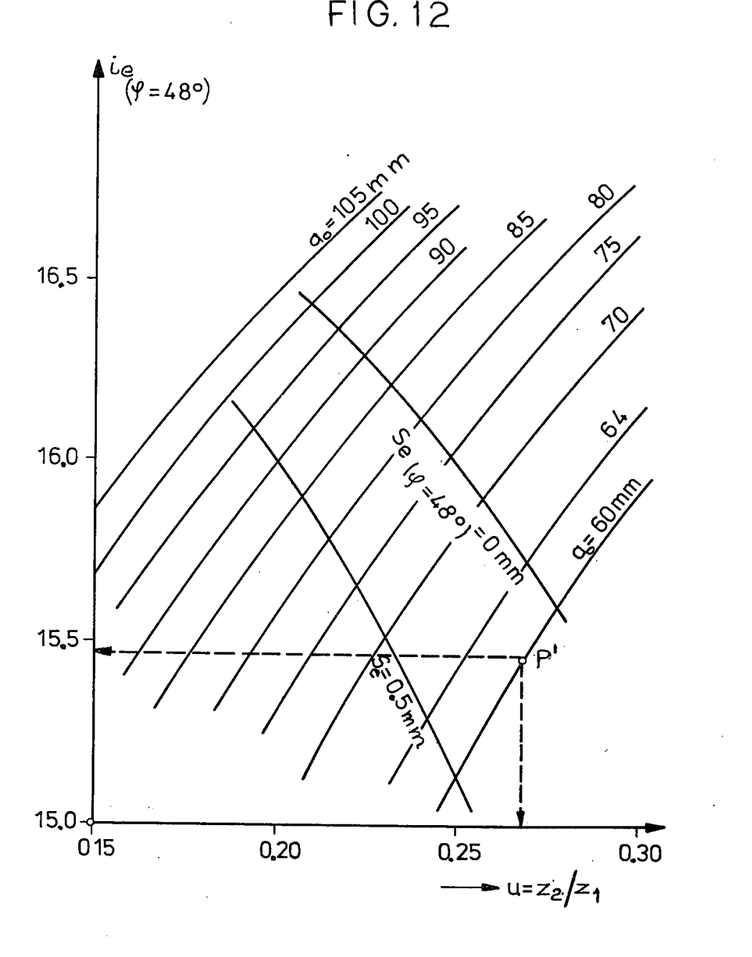
FIG. 12 is a graph analogous to FIG. 11, serving for the determination of center spacing and tooth ratio in the system of FIGS. 4 and 5.

EXAMPLE 2 (FIGS. 4, 5 and 12)

To ensure proper meshing in the limiting positions, the number of teeth 10 has been increased from four to six in comparison with the preceding example. This change, however, is without significance for the calculation of the parameters.

We shall again assume that $\phi_{max} = 48°$, $\alpha_o = 25°$, $h = 11.4$ mm and $m_n = 4$ mm. The starting transmission ratio $i_o$ is here chosen to be 18.0.

For the contact radius in midposition we obtain $$R_{2o} = \frac{18 \cdot 11.4}{2\pi} \approx 32.6 \text{ mm}.$$

Let us assume that it is desired to have a terminal transmission ratio $i_e = 15.5$ and clearance $S_e = 0.3$ mm. Point P' in FIG. 12 corresponds to the desired clearance and a value $i_e = 15.47$, close to the one selected, with $a_o = 60$ mm and $u = 0.268$. With $$z_1 - z_2 = \frac{2 \cdot 60}{4} = 30,$$

we obtain $$z_1 = \frac{30}{0.732} = 41 \text{ and } z_2 = 11.$$

Equation (9a) yields $$r_{o1} = \frac{a_o \cos\alpha_o}{1-u} = \frac{60 \cdot 0.906}{0.732} \approx 74.5 \text{ mm and}$$

$$r_{o2} = 74.5 \cdot 0.268 \approx 20 \text{ mm}.$$

The eccentricity $e$, according to FIG. 4, is given by $$e = R_{2o} - \frac{r_{o2}}{\cos\alpha_o} = 32.6 - \frac{20}{0.906} \approx 10.5 \text{ mm}.$$

The complementary distance $b$ is given by $$b = a_o - e = 60 - 10.5 = 49.5 \text{ mm}.$$

The final angle of attack $\alpha$ is determined, according to equation (4a), from the foregoing values as $\alpha = 5° 29' 30''$. The displacement $v_{max}$, as per equation (5a), is 26.2 mm.

Equations (10a) – (12a) yield the maximum tooth clearance $S_e = 0.27$ mm.

We claim:

1. A gear coupling comprisng:
a first tooth carrier linearly shiftable in a predetermined plane and provided with a first set of identically profiled involute teeth; and
a second tooth carrier swingable about a pivotal axis transverse to said plane and provided with a second set of identically profiled involute teeth, each of said tooth carriers having a base line with a constant radius of curvature in said plane, at least one of said radii being of finite magnitude, said first and second sets of teeth meshing with each throughout a range of displacement between two limiting positions flanking a midposition in which the centers of curvature of the base lines of said first and second sets of teeth are offset from said pivotal axis on a line perpendicular to the direction of shift of said first tooth carrier, said first and second sets of teeth engaging each other with clearances which are substantially zero in said midposition but which progressively increase toward said limiting positions and with a transmission ratio varying substantially monotonically between said midposition and each of said limiting positions.

2. A gear coupling as defined in claim 1 wherein said first tooth carrier is a nut traversed by a helically threaded shaft and held against rotation, said second tooth carrier being a gear sector.

3. A gear coupling as defined in claim 1 wherein the teeth of at least one set are tapered in the direction of said pivotal axis, said tooth carriers being relatively displaceable along said axis for adjusting said clearances.

4. A gear coupling as defined in claim 1 wherein the crests of said first set of teeth lie on an arc convex toward said second set of teeth, said transmission ratio increasing from said midposition to said limiting positions.

5. A gear coupling as defined in claim 4 wherein the crests of said second set of teeth lie on an arc convex toward said first set of teeth.

6. A gear coupling as defined in claim 1 wherein the crests of said first set of teeth lie on an arc concave toward said second set of teeth, the crests of said second set of teeth lying on an arc convex toward said first set of teeth, said centers of curvature lying on opposite sides of said pivotal axis, said transmission ratio decreasing from said midposition to said limiting positions.

* * * * *